US 6,772,368 B2

(12) United States Patent
Dhong et al.

(10) Patent No.: US 6,772,368 B2
(45) Date of Patent: Aug. 3, 2004

(54) MULTIPROCESSOR WITH PAIR-WISE HIGH RELIABILITY MODE, AND METHOD THEREFORE

(75) Inventors: Sang Hoo Dhong, Austin, TX (US); Harm Peter Hofstee, Austin, TX (US); Ravi Nair, Briarcliff Manor, NY (US); Steven Douglas Posluszny, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/734,117

(22) Filed: Dec. 11, 2000

(65) Prior Publication Data

US 2002/0073357 A1 Jun. 13, 2002

(51) Int. Cl.[7] .............................................. G06F 11/16
(52) U.S. Cl. .......................... 714/11; 714/10; 714/15; 714/797; 712/20
(58) Field of Search ............................. 714/10, 11, 12, 714/15, 20, 736, 797, 804, 820; 712/20

(56) References Cited

U.S. PATENT DOCUMENTS

| | | | | |
|---|---|---|---|---|
| 3,810,119 A | * | 5/1974 | Zieve et al. | 709/400 |
| 4,912,707 A | * | 3/1990 | Kogge et al. | 714/17 |
| 5,475,856 A | * | 12/1995 | Kogge | 712/20 |
| 5,504,859 A | | 4/1996 | Gustafson et al. | 395/182.09 |
| 5,586,278 A | | 12/1996 | Papworth et al. | 395/582 |

(List continued on next page.)

OTHER PUBLICATIONS

Smith et al., "Implementing Precise Interrupts in Pipelined Processors," Proceedings of the 12th Annual Symposium on Computer Architecture, pp. 36–44, Jun. 1985 (as reprinted in "Readings in Computer Architecture," pp. 202–213, Mark D. Hill et al. ed., Morgan Kaufmann publ., San Frn. CA 2000).

Northrop et al, "MP 5.2 600MHz G5 S/390 Microprocessor," 1999 IEEE International Solid State Circuits Conference, pp. 88–89.

*Primary Examiner*—Robert Beausoliel
*Assistant Examiner*—Joseph D Manoskey
(74) *Attorney, Agent, or Firm*—Anthony V. S. England; Casimer K. Salys

(57) ABSTRACT

In one embodiment a multiprocessing apparatus includes a first processor and a second processor. Each of the processors have their own data and instruction caches to support independent operation. In a normal mode the processors independently execute separate instruction streams. Each of the processors has a respective signature generator. The system also includes a compare unit coupled to the signature generators. In a high reliability mode, both processors execute the same instruction stream. That is, each processor computes a version of a result for ones of the instructions in the stream. Responsive to the respective versions, the respective signature generators assert signatures to the compare unit, so that a faulting instruction may be detected. In another aspect, each processor has its own respective commit logic. The compare unit signals the commit logic in each respective processor that the possibility has been eliminated of a calculation interrupt arising for that instruction, once the compare unit receives signatures for corresponding versions of a result, but only if the signatures match. This permits the commit logic to commit the result. If the signatures do not match, the compare unit signals the commit logic that the corresponding instruction has faulted. The commit logic permits instructions prior to the faulting instruction in program order to continue execution, but initiates flushing of results that were produced by the faulting instruction and at least some instructions subsequent in program order to the faulting instruction.

19 Claims, 5 Drawing Sheets

U.S. PATENT DOCUMENTS

| | | |
|---|---|---|
| 5,625,789 A | 4/1997 | Hesson et al. ............... 395/393 |
| 5,732,209 A * | 3/1998 | Vigil et al. .................... 714/30 |
| 5,794,024 A | 8/1998 | Golla et al. .................. 395/569 |
| 5,860,014 A | 1/1999 | Cheong et al. ............. 395/733 |
| 5,870,582 A | 2/1999 | Cheong et al. ............. 395/394 |
| 5,915,110 A | 6/1999 | Witt et al. ................... 395/586 |
| 6,173,414 B1 * | 1/2001 | Zumkehr et al. ............... 714/6 |
| 6,357,024 B1 * | 3/2002 | Dutton et al. ................. 714/45 |
| 6,615,366 B1 * | 9/2003 | Grochowski et al. ......... 714/10 |

* cited by examiner

MULTIPROCESSOR WITH PAIR-WISE HIGH RELIABILITY MODE, AND METHOD THEREFORE

BACKGROUND OF THE INVENTION

1. Field of the Invention

The present invention relates to high reliability processing, by hardware redundancy. More particularly, the invention relates to a processing system with pair-wise processors that operate in a high reliability mode to detect computational errors, and operate independently in a high performance mode.

2. Description of the Related Art

Various approaches exist for achieving high reliability processing. FIG. 1 illustrates one prior art processor 100 for high reliability processing. The processor 100 includes two execution units 130 and 135, which are both the same type of arithmetic unit. For example, the two execution units could both be floating point units, or integer units. The processor 100 has architected registers 120 for holding committed execution results. The two execution units 130 and 135 both execute the same instruction stream in parallel. That is, for each instruction an instance of the instruction executes in each respective execution unit 130 and 135. Then, when the two units are ready to commit the result for an instruction to the register file 120, the two versions of the result are compared by compare unit 125. If the compare unit 125 determines that the versions are the same, then the unit 125 updates one or more of the registers 120 with the result. If the versions do not match, then other actions are taken. In one implementation, a counter records whether an error is occurring repeatedly, and if it is, the error is classified as a "hard" failure. In the case of a hard failure, the instruction issue mechanism does not reissue the faulting instruction, but instead executes a "trap" instruction. One such trap leads to a micro code routine for reading out the state of the defective processor and loading it into a spare processor, which restarts execution at the instruction that originally faulted. In an alternative, where no spare processor is available, the trap leads to the operating system migrating the processes on the faulty processor to other processors, which adds to the workload of the other processors.

While this arrangement provides a reliability advantage, it is disadvantageous in that the processor design is more complex than a conventional processor and has greater overhead. Moreover, it limits the processor 100 throughput to have two execution units 130 in the processor 100 both executing the same instruction stream. Another variation of a processor which is designed for exclusively high reliability operation is shown in Richard N. Gufstason, John S. Liptay, and Charles F. Webb, "Data Processor with Enhanced Error Recovery," U.S. Pat. No. 5,504,859, issued Apr. 2, 1996.

FIG. 2 illustrates another arrangement for high reliability processing. In this voting arrangement, three processors 200 each execute the same program in parallel and versions of a result are compared at checkpoints in the program on a bus 160 external to the processors 100. If the versions do not match, then other actions are taken, such as substituting a different processor 100 for the one that produced the disparate version. This arrangement is advantageous in that complexity of the individual processors 200 is reduced, and an error producing processor can be identified. Also, the throughput of one of the processors 200 may be greater than that of the one processor 100 in FIG. 1, since the individual processor 200 does not devote any of its execution units to redundant processing. However, the arrangement of FIG. 2 is redundant at the level of the processors 200, and uses three whole processors 200 to recover from a single fault. Also, the error checking is limited to results which are asserted externally by the processors.

From the foregoing, it may be seen that a need exists for improvements in high reliability processing.

SUMMARY OF THE INVENTION

The foregoing need is addressed in the present invention. According to the invention, in a first embodiment, a multiprocessing system includes a first processor and a second processor. Each of the processors have their own data and instruction caches to support independent operation. In a first mode, a "high performance" mode, the processors independently execute separate instruction streams. In a second mode, a "high reliability" mode, both processors execute the same instruction stream. That is, for an instruction in the stream each processor computes its own version of a result.

The system includes a compare unit for indicating whether the respective versions match. If the versions do not match for an instruction, the instruction is deemed to be a faulting instruction. Responsive to the system being in the high reliability mode and the compare unit indicating a faulting instruction, the processors recover a state that the processors had prior to execution of the faulting instruction, and the processors re-execute the faulting instruction.

In an embodiment, each of the processors has a respective signature generator. Each of the signature generators is coupled to the compare unit. Responsive to the respective versions, the signature generators assert signatures to the compare unit, so that a faulting instruction may be detected.

In another aspect, each processor has its own respective commit logic. If the compare unit receives matching signatures for corresponding versions of a result, the compare unit signals the commit logic in each respective processor that the possibility has been eliminated of a calculation interrupt arising for that instruction. This permits the commit logic to commit the result. If the signatures do not match, the compare unit signals the commit logic that the corresponding instruction has faulted. In response, the commit logic permits instructions prior to the faulting instruction in program order to continue execution, but flushes instructions, and their results, that follow the faulting instruction in program sequence. Alternatively, the commit logic flushes those results that were produced by the faulting instruction, and only selected instructions results subsequent in program order to the faulting instruction, that is, those instructions and their results dependent on the faulting instruction.

In still another aspect, in one embodiment such a signature includes a bit indicating parity for the signature's corresponding version of the result. For one such embodiment, the signature consists of a single parity bit. In an alternative, the signature includes a number of parity bits for respective subsets of its version. In another embodiment, the signature includes a sum for all the bits of its version of the result. In another embodiment, the signature includes the entire version itself.

In another aspect, the system includes complete logic for generating an error correction code for including as part of the processor state with an instruction result. For such a instruction result, the signature generators produce their respective signatures in response to their respective result versions, including the error correction codes for the versions.

In a still future aspect, in the high performance mode, in which the processors execute separate programs or instruction streams, each processor will have independent bus accesses through its own respective bus logic. For this circumstance, mode control logic notifies arbitration logic in the bus interface unit to arbitrate between the independent bus requests of the two bus logic units.

In the high reliability mode, in which the two processors both execute the same program or instruction stream in parallel, each processor will need identical, lockstep bus accesses. For this circumstance, mode control logic notifies arbitration logic in the bus interface unit to allow only one of the bus logic units to control bus requests and read the bus for both processors in the system.

In a further aspect, since the processors are subject to external interrupts, which can disturb synchrony unless coordinated properly, the bus interface unit for the system has common external interrupt logic which responds to external interrupt requests and signals both processors simultaneously to respond to the interrupt request. The response may include merely setting a bit in a register for later follow up, or it may include causing the processor to branch to a micro code routine, execute a trap instruction calling an operating system routine, or even terminate dual execution of an instruction stream, so that the processors terminate in synchrony.

In another embodiment, a method for multiprocessor operation includes a step of selecting an operating mode. Responsive to being in a high performance mode, two processors independently execute separate instruction streams. Responsive to being in a high reliability mode, the two processors concurrently execute instructions of one instruction stream, wherein each of the processors computes a respective version of a result for an instruction in the stream.

In a further aspect, responsive to the respective versions of an instruction result, signature generators assert signatures to a compare unit, so that a faulting instruction may be detected. Responsive to the system being in the high reliability mode and the compare unit indicating a faulting instruction, the processors recover a state that the processors had prior to execution of the faulting instruction, and the processors re-execute the faulting instruction. Responsive to the system being in the high reliability mode and the compare unit indicating a correctly calculated instruction, commit logic for each respective processor commits the result in each processor.

In another aspect, the respective versions of an instruction result include an error correction code, and in a method step the signature generators produce their respective signatures in response to their respective result versions, including the error correction codes for the versions.

In another aspect, in the high performance mode, in which the processors execute separate programs or instruction streams, each processor will have independent bus accesses through its own respective bus logic. For this circumstance, a method embodiment includes a step of mode control logic notifying arbitration logic in the bus interface unit to arbitrate between the independent bus requests of the two bus logic units. In the high reliability mode, in which the two processors both execute the same program or instruction stream in parallel, each processor will need identical, lockstep bus accesses. For this circumstance, the method embodiment includes a step of mode control logic notifying arbitration logic in the bus interface unit to allow only one of the bus logic units to control bus requests and read the bus for both processors in the system.

In a further aspect, a method embodiment includes the step of a bus interface unit for the system synchronously signaling both processors to respond to the interrupt request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
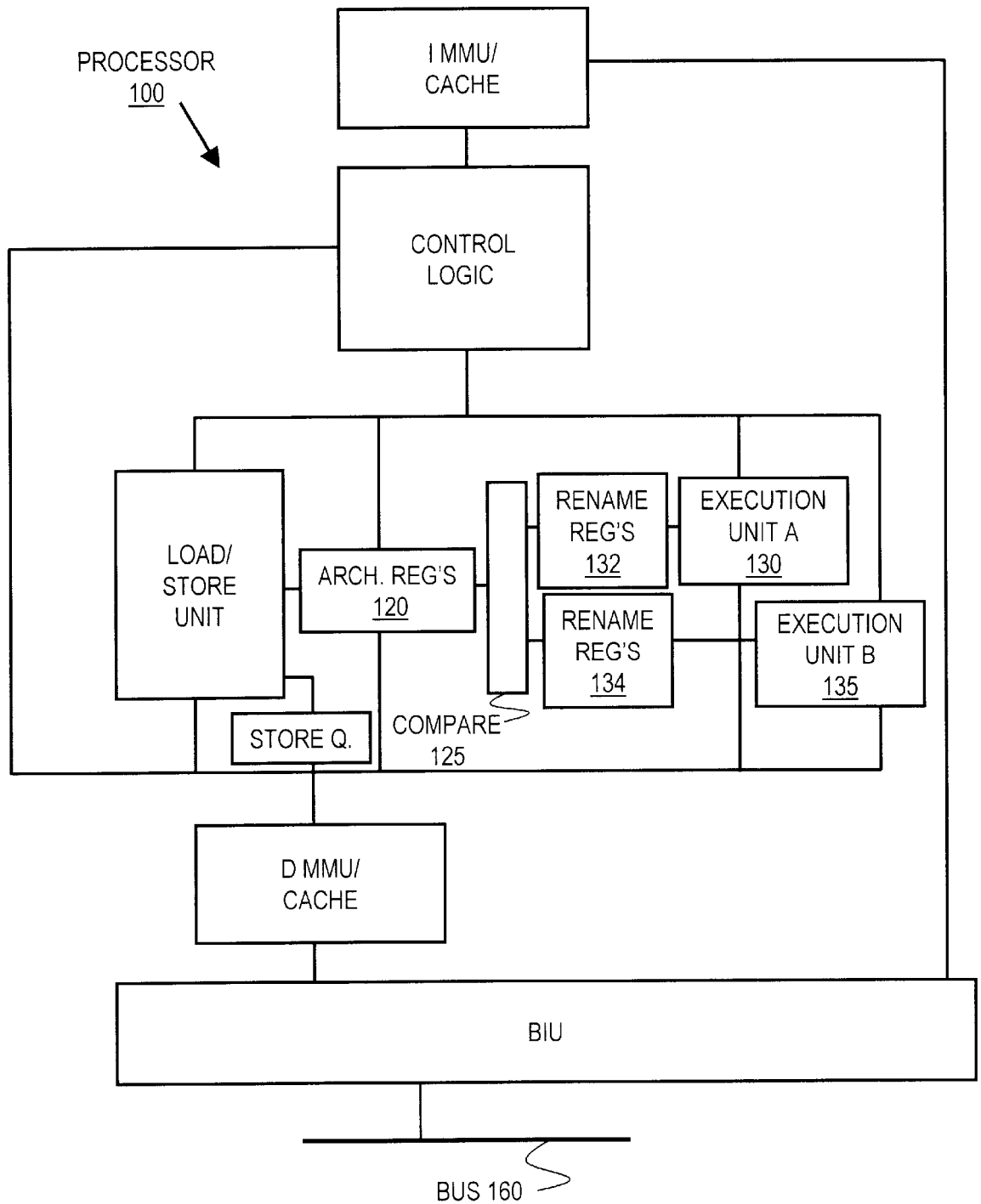
FIG. 1 illustrates a prior art processor for high reliability processing.
Figure 2:
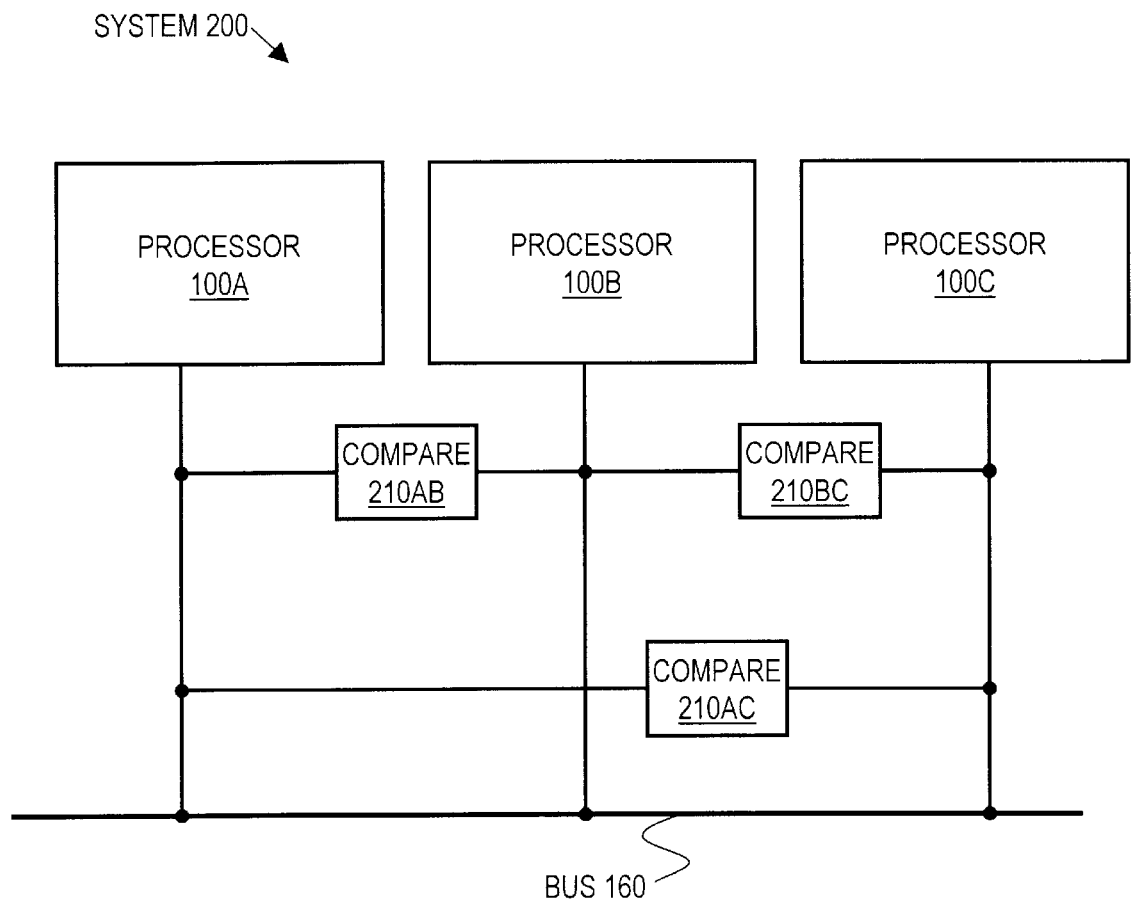
FIG. 2 illustrates another prior are system for high reliability processing.
Figure 3:
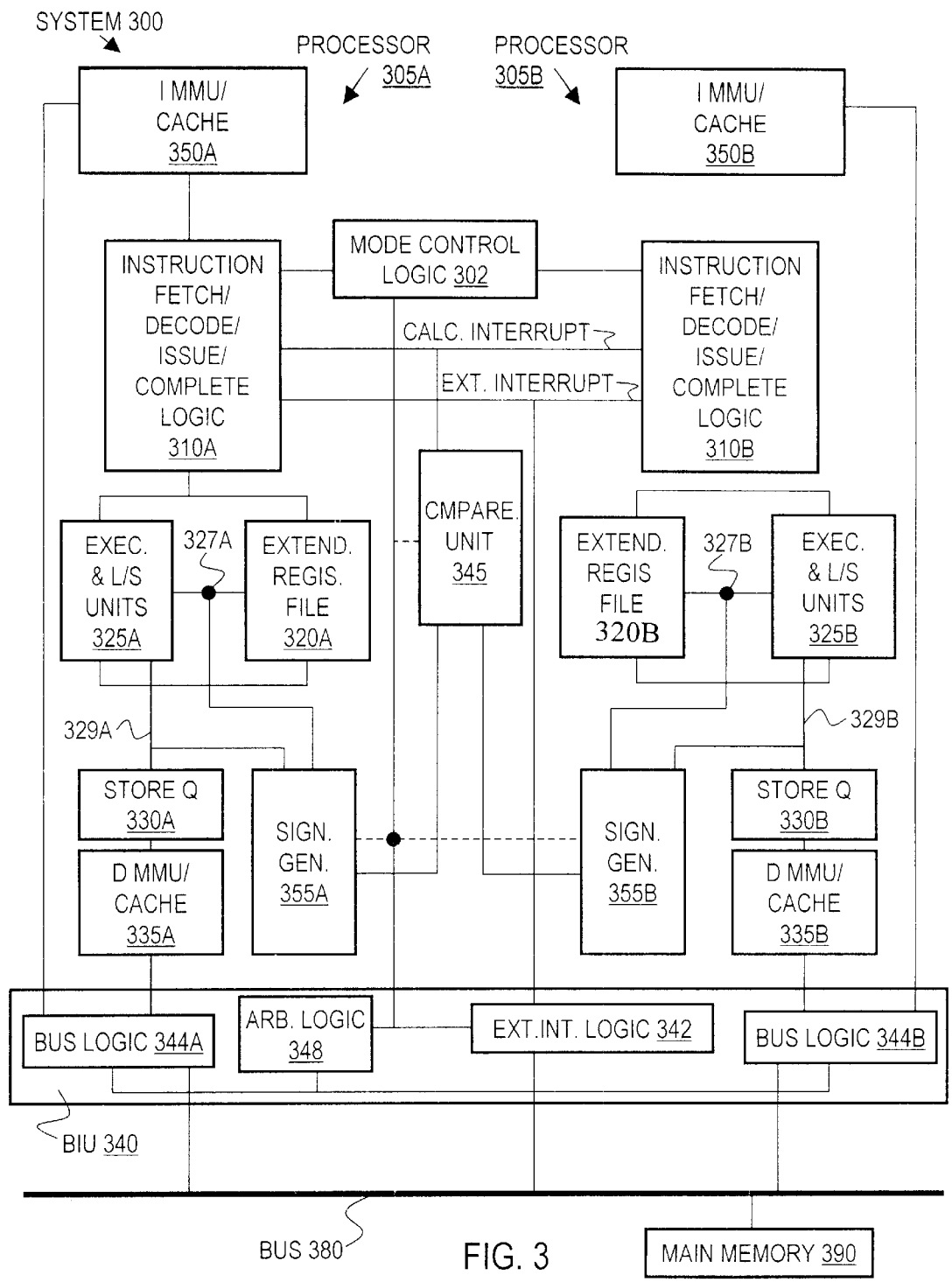
FIG. 3 illustrates a dual-processor system for high reliability processing, according an embodiment of the present invention.

Referring now to FIG. 3, a high reliability processing system 300 is shown having first and second processors 305A and 305B. Elements of the processors are numbered identically, but with respective suffixes "A" and "B." Hereinafter, in circumstances where the context permits, elements will be described without explicit reference to suffixes, and it should be understood that the suffixes are implied.

Each processor has an extended register file 320 for holding execution results produced by execution and load/store units 325. The extended register file includes architected registers and supplemental registers. In one embodiment, the supplemental registers include rename registers (sometimes referred to as a "future file"). In an alternative embodiment, the supplemental registers include a history file.

In accordance with state-of-the-art processors, the processors 305 each have a built-in, state recovery mechanism for handling recovery from interrupts. The following explanation is to avoid misunderstanding of the intended meaning of "interrupt" and "state recovery."

In state-of-the-art processors a key implementation technique is "pipelining," wherein execution is overlapped for multiple instructions. See David A Patterson and John L. Hennessy, "Computer Architecture a Quantitative Approach," pp. 126–187, Morgan Kaufmann Publ. Inc., 1996 (discussing pipelining and hazards associated with pipelining); see also James E. Smith, and Andrew R. Pleszkun, "Implementing Precise Interrupts in Pipelined Processors," Proceedings of the 12th Annual Symposium on Computer Architecture, pp. 36–44, June 1985 (as reprinted in "Readings in Computer Architecture," pp. 202–213, Mark D. Hill et al. editors, Morgan Kaufmann publisher, San Francisco, Calif., 2000) which are hereby incorporated herein by reference. Because of this overlapping, it is difficult to know whether an instruction can change, i.e., commit its result irrevocably to, the processor 305 "state." (Processor state includes memory and the processor program counter and registers.)

A number of exceptional situations can arise that call for aborting instructions midway through a pipeline. These include i/o device requests, operating system servicing being invoked by a user program, instruction execution tracing, programmer requested interrupts (a.k.a. "breakpoints"), arithmetic calculation overflow or underflow, page faults, misaligned memory accesses, hardware malfunctions, power failure, use of undefined instructions, memory protection violations, and the like.

This pipelining complication is compounded by hardware based speculation that is commonly implemented in state-of-the-art processors, according to which instructions are executed out of order and speculatively, i.e., before resolving dependencies with respect to branch instructions. Incorrect prediction of a whether a branch instruction will be taken or not, is thus another exceptional situation that calls for aborting instructions.

For these reasons, a state recovery mechanism is included in state-of-the-art processors to deal with a "faulting" instruction that gives rise to one of these exceptional situations. According to this mechanism, execution of instructions which are immediately before a faulting instruction in program order are allowed to complete, thereby committing their results to the processor state, but instructions immediately after the faulting instruction, and possibly including the faulting instruction, depending on the context, are restarted. Terminology for these exceptional situations is commonly used in an inconsistent fashion. In the present application, the terms "faults," "exceptions" or "interrupts" are used interchangeably for these exceptional situations.

In the context of FIG. 3, the state recovery mechanism includes data storage in the extended register file 320 and store queue 330 for preserving state information, and control logic 310 for restoring the information to selected registers and re-fetching and re-executing instructions in response to a interrupt, and for discarding the information once the information is committed.

Figure 4:
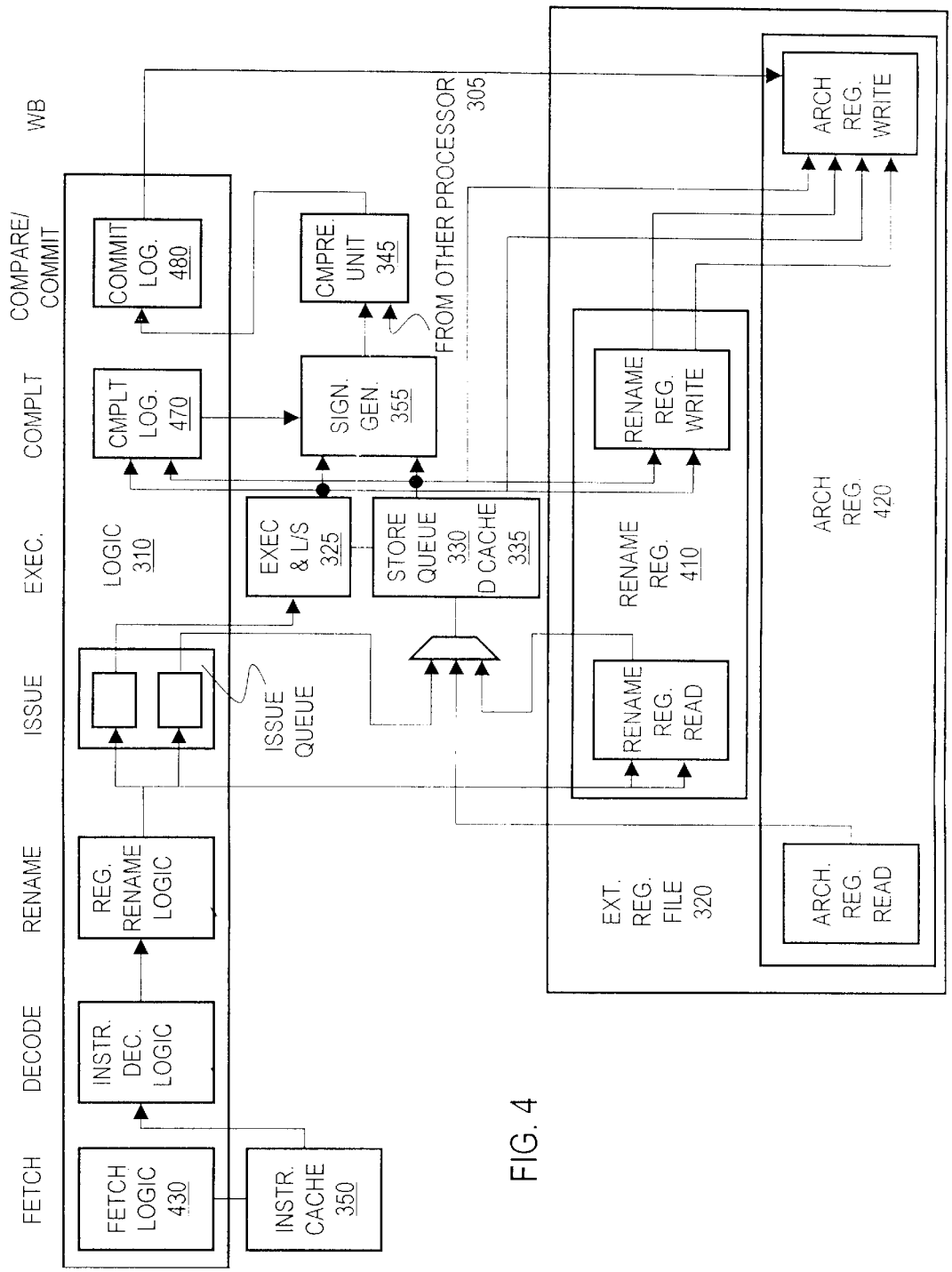
FIG. 4 illustrates certain details of one embodiment of the system of FIG. 3, which uses rename registers.

Referring now to FIG. 4, aspects of state maintenance and recovery are illustrated for and embodiment of pipeline processor 305, according to which the extended register file 320 includes a "future file," also referred to as "rename registers" 410. Pipeline stages, fetch, decode, rename, etc. are shown at the top of FIG. 4. In this embodiment, the architected registers 420 hold execution results for instructions which are committed, and the rename registers 410 hold execution results for instructions which are not yet committed. That is, according to this embodiment, an execution/load-store unit 325 writes its result to one or more of the rename registers 410 or the store queue 330, and responsive to determining when the possibility no longer exists of an exception arising that could change the execution result, commit logic 480 commits the result, causing it to be written to one or more of the architected registers 420, or to memory 390, which may thereby displace a previous result in one or more of the architected registers 420 or memory 390. More specifically, in connection with the result produced by an execution/load-store unit 325, complete logic 470 computes an error correction code and the signature generator 355 produces a signature in response to the result, including the error correction code. The signature is compared by compare unit 345, and an indication of a match or disparity between signatures is output to commit logic 480. In addition to conventional checks, commit logic 480 of the present invention receives the compare unit 345 output and either commits the result if a match is indicated or initiates state recovery if a disparity is indicated.

According to the embodiment of FIG. 4, if a interrupt occurs for an faulting instruction, which includes an indication by compare unit 345 of a calculation fault, logic 310 permits instructions prior to the faulting instruction in program order to continue, but initiates flushing of results in the extended register file 320 and store queue 330 that were produced by the faulting instruction and those subsequent to it in program order. In another embodiment, logic 310 flushes the results of the faulting instruction and those instructions that are subsequent, but only if they used a result arising from the result of the faulting instruction. The flushed instructions are re-fetched from the instruction cache 350 by fetch logic 430 for re-execution.

Figure 5:
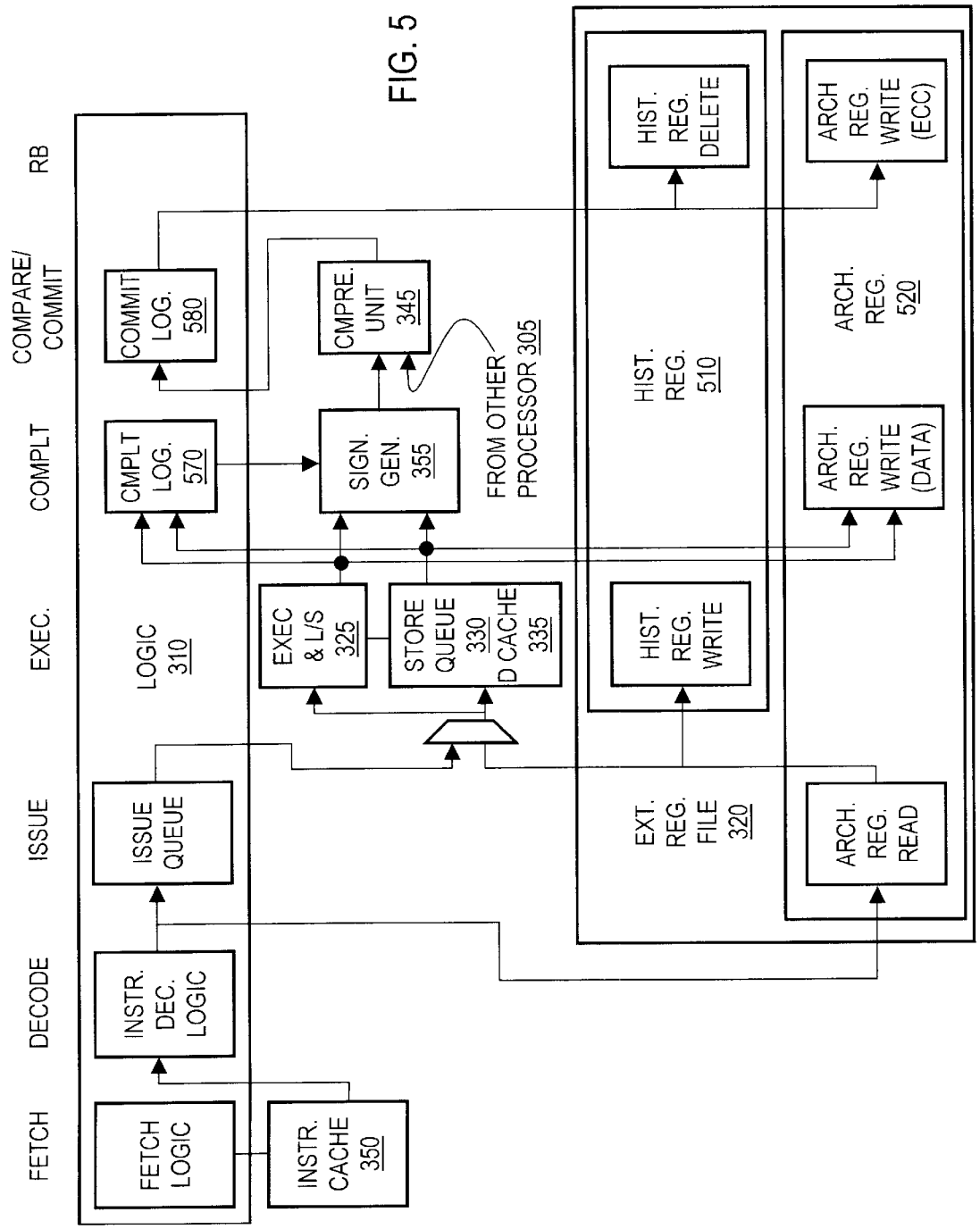
FIG. 5 illustrates certain details of one embodiment of the system of FIG. 3, which uses history registers.

Referring now to FIG. 5, aspects of state maintenance and recovery are shown for an alternative embodiment, according to which the extended register file 320 includes a history file 510. In this embodiment, the architected registers 520 have future state results. The history registers 510 hold prior values that have been overwritten in architected registers, and may include execution results that are not yet committed. That is, according to this embodiment, an execution/load-store unit 325 writes its result immediately to one or more of the architected registers 520. (This is in contrast to the future file embodiment, where a result is written first to the supplemental registers and then later committed it to the architected registers. Thus, for the history file embodiment, the architected registers hold future, i.e., uncommitted state.) According to this history file embodiment, the result also gets written to one or more of the history registers in case of forwarding, similar to forwarding into operand registers. When completion logic 570 determines a result stored in a history register is no longer subject to an interrupt, commit logic 580 commits the result, releasing the entry for the result in the history file, so the entry can be used for a subsequent result. This releasing of an entry at least effectively, if not literally, shifts the result out of the history file.

Referring again to FIG. 3, it should be understood that for both the FIGS. 4 and 5 state maintenance and recovery mechanism embodiments, the store queue 330 temporarily stores execution results for main memory, pending the results being committed. In an alternative embodiment, the store queue is subsumed in the rename registers 410 (FIG. 4). Regardless of the embodiment, the extended register file 320 and store queue 330 supply results needed by other instructions during the interval after execution of an instruction and before the instruction commits. More to the point of the present invention, they hold results that can be used for state recovery.

Referring again to FIG. 3, for both of the embodiments shown in FIGS. 4 and 5 the processing system 300 of FIG. 3 includes mode control logic 302, for selecting between a high performance mode ("first mode") and a high reliability mode ("second mode") of operating the processors 305.

In the high performance mode the processors 305 execute separate programs or instruction streams. Consequently, processors 305 include their own caches 335 and 350, to support this independent operation. In this mode, each processor 305 will have independent accesses to bus 380, so mode control logic 302 notifies arbitration logic 348 in the bus interface unit 340 to arbitrate between the independent bus requests of bus logic 344A and 344B.

In the high reliability mode, the two processors 305 both execute the same program or instruction stream in parallel. That is, for one of the instructions in the stream each processor computes its own version of a result. In this mode, each processor 305 will need identical, lockstep bus 380 accesses, so mode control logic 302 notifies arbitration logic 348 in the bus interface unit 340 to allow only one of the bus logic units 344 to control bus 380 requests and read the bus 380 for both processors 305 in the system 300. Also, the arbitration logic compares requests from the processors 305, to check that both are generating the same requests in the same cycle.

The system 300 includes a compare unit 345 for indicating whether the two processors' respective versions of instruction results match. If the versions do not match for an instruction, the instruction is deemed to be a faulting instruction. Responsive to the system 300 being in the high reliability mode and the compare unit 345 indicating a faulting instruction, the processors 305 recover a state that the processors had prior to execution of the faulting instruction, and the processors re-execute the faulting instruction.

In an embodiment, each of the processors 305 has at least one respective signature generator. In FIG. 3, each processor 305 has a signature generator 355 coupled to a bus 327 for communicating instruction results for storing in the extended register file 320, and also to a bus 329 for communicating instruction results for storing in the store queue 330. Each of the signature generators 355 is coupled to the compare unit 345. Responsive to the respective result versions, the signature generators 355 assert signatures to the compare unit 345, so that a faulting instruction may be detected.

The system 300 is set to the first or second mode responsive to a control signal from mode select logic 302. According to one embodiment, in the high performance mode, the mode select logic 302 asserts a signal to the instruction fetch/decode/issue/complete logic 310 so that the logic 310 does not respond to any calculation interrupt signals generated by the compare unit 345. In one alternative embodiment, indicated by dashed lines, in FIG. 3 the mode control logic 302 turns off the compare unit 345 in the high performance mode. Alternative, also indicated by dashed lines, the mode control logic 302 turns off signature generating units 355 in the high performance mode.

Both processors 305 are built with deterministic logic, and thus as long as both processors 305 are initialized in the exact same state, and as long as both are provided with the same, synchronous inputs in the same clock cycle, and as long as no hardware errors occur, both processors will remain in lockstep. One function of mode control logic 302 coupled to instruction fetch/decode/issue/complete logic 310 is to control this initializing and synchronous instruction fetching.

Aside from synchrony in connection with the processors beginning execution of an instruction stream, another synchronizing issue also arises upon a demand for the processors to respond to an interrupt request. That is, the processors 305 may, of course, be subject to an external interrupt which could disturb synchrony, unless the dual processor 305 operation is coordinated properly. Accordingly, the processor 305 bus interface unit 340 has common external interrupt logic 342 which responds to external interrupt requests and signals logic 310 both processors simultaneously to respond to the interrupt request. The response may include merely setting a bit in a register for later follow up, or it may include causing the processor to branch to a micro code routine, execute a trap instruction calling an operating system routine, or even terminate dual execution of an instruction stream, so that the processors terminate in synchrony. That is, external signals to the BIU 340 that are going to the processors 305 are asynchronous. Since it would be impossible to guarantee that two arbitration circuits will always make identical decisions in synchronizing asynchronous signals, therefore this indeterminism is removed, according to an embodiment, by external interrupt logic 342 so that every external asynchronous signal is synchronized once, before it is copied to the processors 305, and no further synchronization is required in the processors 305. Synchronization circuits applicable for this function are well known, including Mead and Conway, "Introduction to VLSI Systems," Chapter 8, System Timing, which is written by Charles Seitz, and is hereby incorporated herein by reference.

In rare cases a hardware fault may cause the processors 305 to go out of lockstep operation, such as due to a fault that causes an incorrect bit in a non-architected and non-protected register. This will manifest itself as a sequence of miscompares in the compare unit 345. According to an embodiment of the invention, a string of miscompares will cause micro code to be called as in the prior art. That is, a counter (not shown) records whether an error is occurring repeatedly, and if it is, the error is classified as a "hard" failure. In the case of a hard failure, the instruction issue mechanism does not reissue the faulting instruction, but instead executes a "trap" instruction. One such trap leads to a micro code routine for reading out the state of the defective processor and loading it into a spare processor, which restarts execution at the instruction that originally faulted. In an alternative, where no spare processor is available, the trap leads to the operating system migrating the processes on the faulty processor to other processors, which adds to the workload of the other processors.

After an execution unit 305 has computed its result for an instruction to store queue 330 or one of the extended registers 320, and after any error correction code has been determined by the logic 310, the result, including any error correction code, is processed by the signature generator 355, which computes a signature for the result. In one embodiment, the signature generator 355 computes parity for the result and outputs a single bit indicating the parity. In another embodiment, the signature generator computes 8 parity bits for each 8 bytes in a 64 bit word. In another embodiment, bi-directional parity is computed. That is, for example, the parity of every eighth bit is computed in addition to the parity per 8 successive bits. In another embodiment, the signature includes the sum of all bits in the result. The signature may also include the identify function.

For each instruction producing a result for the extended register file 320A or the store queue 330A, processor 305A signature generator 355A outputs a signature to compare unit 345 for the processor 305A version of the result. Likewise, for the same instruction processor 305B signature generator 355B outputs a signature to compare unit 345 for the processor 305B version of the result. Given that the processors 305 maintain their instruction execution in lock step, in accordance with the above described synchronizing mechanisms, the compare unit 345 receives corresponding signals in synchrony from both signature generators 350A and 350B. If the signatures do not match for the two versions of an instruction's result, this indicates that the two processors 305 calculated different values for their respective versions of the result, which may be referred to herein as a "calculation interrupt" arising from a "faulting instruction." This suggests that one of the values is wrong. If the signatures match from the two processors 305, the compare unit 345 signals the commit logic 310 in each respective processor 305 that the possibility has been eliminated of a calculation interrupt arising for that instruction, permitting the commit logic 310 to commit the result.

If a faulting instruction produces a calculation interrupt, then results are suspect for any instruction that is subsequent to the faulting instruction in program order, provided that the subsequent instruction used a result arising from the result of the faulting instruction. Therefore, the faulting instruction and any such subsequent instruction needs to be re-executed. According to an embodiment of the invention, if compare unit 345 signals logic 310 of a calculation interrupt, logic 310 permits instructions prior to the faulting instruction in program order to continue, but initiates flushing of results in the extended register file 325 and store queue 330 that were produced by the faulting instruction and those subsequent to it in program order. In another embodiment, logic 310 flushes the results of the faulting instruction and those instructions that are subsequent, but only if they used a result arising from the result of the faulting instruction.

Many modifications and variations will be apparent to those of ordinary skill in the art. For example, it should be understood that the embodiments illustrated in FIGS. 3 through 5 are merely selected ones of numerous possible embodiments and that operation and structure may vary. Numerous embodiments of the state maintenance and recovery elements of the present invention are contemplated. Variations and additional specific details of state maintenance and recovery elements are described in numerous references, including the following, which are hereby incorporated herein by reference:

"Improved History File System and Method in a Pipelined MicroProcessor," U.S. patent application Ser. No. 09/498,089, filing date Feb. 4, 2000;

Hoichi Cheong, Hung Qui Le, John Stephen Muhich, and Steven Wayne White, "Method and Apparatus for Improved Recovery of Processor State Using History Buffer," U.S. Pat. No. 5,860,014, Jan. 12, 1999;

Hoichi Cheong, Hung Qui Le, John Stephen Muhich, and Steven Wayne White, "Method and Apparatus for Completion of Non-Interruptible Instructions Before the Instruction is Dispatched," U.S. Pat. No. 5,870,582, Feb. 9, 1999; and David A Patterson and John L. Hennessy, "Computer Architecture a Quantitative Approach," pp. 309–349, Morgan Kaufmann Publ. Inc., 1996.

The embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A multiprocessing system comprising:
   a first processor having a first set of architected registers and a first execution pipeline;
   a second processor having a second set of architected registers and a second execution pipeline;
   mode control logic, wherein in a first mode the processors independently execute separate instruction streams, and in a second mode both processors execute one instruction stream, wherein in the second mode!for ones of the instructions in the stream each processor computes corresponding versions of a result;
   compare logic for indicating whether the respective versions of an instruction match;
   first commit logic and first state recovery means for the first processor; and
   second commit logic and second state recovery means for the second processor, wherein such a state recovery means for one of the processors operates in both the first and second modes and is for preserving state information and for restoring the state information to the processor; and architected registers, the restoring being responsive to a faulting instruction causing instructions to be aborted in the processor's pipeline, wherein such a faulting instruction includes an instruction causing an arithmetic calculation overflow or underflow wherein responsive to the compare unit indicating a disparity between the versions of one of the results the compare unit signals the first and second commit logics that the corresponding instruction has faulted, and the commit logics permit instructions prior to the faulting instruction in program order to continue execution, but initiate: i) flushing of instructions, and results of the flushed instructions, for instructions following the faulting instruction in program order and ii) the restoring of the state information by the state recovery means.

2. The system of claim 1, comprising:
   a first signature generator for the first processor;
   a second signature generator for the second processor, each the signature generators being coupled to the compare unit, wherein responsive to the respective versions, the signature generators assert signatures to the compare unit, so that such a disparity between the versions of one of the results may be detected.

3. The system of claim comprising:
   first bus logic unit for the first processor;
   second bus logic unit for the second processor; and
   bus arbitration logic, wherein in the first mode each one of the processors generates bus requests independently through its respective bus logic unit, and bus arbitration logic arbitrates between the independent bus requests, and in the second mode one of the bus logic units controls bus requests and reads the bus for both processors in the system.

4. The system of claim 3, comprising:
   external interrupt logic, wherein the external interrupt logic responds to external interrupt requests and signals both processors concurrently to respond to an interrupt request.

5. The system of claim 2, wherein such a signature includes a bit indicating parity for the signature's corresponding version of the result.

6. The system of claim 2, wherein such a signature includes a number of parity bits for respective subsets of its version.

7. The system of claim 2, wherein such a signature includes a sum for all the bits of its version of the result.

8. The system of claim 2, wherein such a signature includes the entire version of the result itself.

9. The system of claim 2, comprising
   complete logic for generating an error correction code for an instruction result, wherein for such a instruction result, the signature generators produce their respective signatures in response to their respective result versions, including the error correction codes for the versions.

10. The apparatus of claim 1, wherein such a faulting instruction causing the aborting instructions in the pipeline of one of the processors includes an instruction causing an i/o device request, a page fault, a misaligned memory access, a use of an undefined instruction and a memory protection violation.

11. A method for multiprocessor operation, comprising the steps of:

a) selecting an operating mode for first and second processors;

b) executing separate instruction streams by the two processors, responsive to selecting a first mode in step a);

c) executing instructions of one instruction stream by the two processors concurrently, responsive to selecting a second mode in step a), wherein each of the two processors computes a respective version of a result for corresponding ones of the instructions in the stream, and wherein the processors have respective states prior to execution of each instruction;

d) preserving state information for the respective states of the processors in respective state recovery means;

e) restoring respective ones of the states to architected registers of the respective processors by the respective state recovery means, the restoring being responsive to a faulting instruction causing instructions to be aborted in a pipeline of one of the processors, wherein the respective state recovery means operate in both modes and such a faulting instruction includes an instruction causing an arithmetic calculation overflow or underflow;

f) asserting signatures to a compare unit responsive to the respective versions of an instruction result;

g) restoring respective ones of the states to the architected registers of the respective processors by the respective state recovery means responsive to the processors being in the second mode and the compare unit indicating that respective ones of the versions of a result do not match; and h) re-executing, by the respective processors, the instruction for which the respective result versions did not match; and h) committing one of the results in each processor, responsive to the processors being in the second mode, and the compare unit indicating a correctly calculated instruction.

12. The method of claim 11, comprising the steps of:

arbitrating between independent bus requests for each of the two respective processors responsive to the processors being in the first mode, so that each processor will have independent bus accesses through respective bus logic units of the respective processors; and controlling bus requests and reading the bus by a single one of the bus logic units for both of the processors responsive to the system being in the second mode, so that the two processors have lockstep bus accesses.

13. The method of claim 12, comprising the step of synchronously signaling both processors to respond to an interrupt request, responsive to an asynchronous external interrupt request, so that the processors do not have to take further action to synchronize to one another in response to the asynchronous external interrupt request.

14. The method of claim 11, wherein such a signature includes a bit indicating parity for the signature's corresponding version of the result.

15. The method of claim 11, wherein such a signature includes a number of parity bits for respective subsets of the signature's corresponding suit version.

16. The method of claim 11, wherein such a signature includes a sum for all the bits of its version of the result.

17. The method of claim 11, wherein such a signature includes the entire version itself.

18. The method of claim 11, wherein the respective versions of an instruction result include an error correction code, the method comprising the step of producing respective signatures by the signature generators in response to their respective result versions, including the error correction codes for the versions.

19. The method of claim 11, wherein such a faulting instruction causing the aborting of instructions in the pipeline of one of the processors includes an instruction causing an i/o device request, a page fault, a misaligned memory access, a use of an undefined instruction or a memory protection violation.

* * * * *